(12) United States Patent
Raghavan et al.

(10) Patent No.: US 10,154,346 B2
(45) Date of Patent: Dec. 11, 2018

(54) DYNAMICALLY ADJUST AUDIO ATTRIBUTES BASED ON INDIVIDUAL SPEAKING CHARACTERISTICS

(71) Applicant: DISH Technologies L.L.C., Englewood, CO (US)

(72) Inventors: Srinath Raghavan, Englewood, CO (US); Saksham Ghimire, Englewood, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

(21) Appl. No.: 15/494,342

(22) Filed: Apr. 21, 2017

(65) Prior Publication Data
US 2018/0310100 A1 Oct. 25, 2018

(51) Int. Cl.
*H04R 29/00* (2006.01)
*H03G 3/00* (2006.01)
(Continued)

(52) U.S. Cl.
CPC .............. *H04R 5/04* (2013.01); *G10L 15/005* (2013.01); *H04R 3/04* (2013.01); *H04R 5/02* (2013.01);
(Continued)

(58) Field of Classification Search
CPC ...... H03G 3/001; H03G 3/002; H03G 3/3005; H03G 3/3089; H03G 3/32; H03G 3/04;
(Continued)

(56) References Cited

U.S. PATENT DOCUMENTS 5,792,971 A * 8/1998 Timis et al. ............... 84/609
7,653,543 B1 1/2010 Blair et al.
(Continued)

FOREIGN PATENT DOCUMENTS

WO 2015/069267 A1 5/2015

OTHER PUBLICATIONS

Aschmann, Rick. "North American English Dialects, Based on Pronunciation Patterns," retrieved from http://www.aschmann.net/AmEng/, on Apr. 24, 2017, 57 pages.
(Continued)

*Primary Examiner* — Xu Mei
(74) *Attorney, Agent, or Firm* — Seed IP Law Group LLP

(57) ABSTRACT

Embodiments are directed towards analyzing content to adjust audio attributes of an audio component of the content to improve a user's audible perception of the content. The content is analyzed to determine an accent of an individual speaking in the content, an ethnic origin or gender of the individual, a genre of the content, or user preferences of the user, or some combination thereof. One or more of these determined characteristics is utilized to select and adjust at least one audio attribute of the audio component of the content, e.g., the volume, base, or treble. The audio component of the content is then output to at least one audio output device based on the at least one adjusted audio attribute. These audio attribute adjustments can improve a user's perception of the audio component, which can improve the user's understanding of the individual speaking in the content.

21 Claims, 7 Drawing Sheets

(51) Int. Cl.
| | |
|---|---|
| *H04R 5/04* | (2006.01) |
| *H04S 5/00* | (2006.01) |
| *H04S 7/00* | (2006.01) |
| *H04R 5/02* | (2006.01) |
| *G10L 15/00* | (2013.01) |
| *H04R 3/04* | (2006.01) |
| *G10L 15/22* | (2006.01) |

(52) U.S. Cl.
CPC ................. *H04S 5/00* (2013.01); *H04S 7/30* (2013.01); *G10L 15/22* (2013.01); *H04R 2430/01* (2013.01)

(58) Field of Classification Search
CPC .... H03G 1/0088; H03G 1/02; H04R 2430/01; H04R 3/04; H04R 5/04; G06F 17/271; G10L 15/22
USPC .............. 704/275, 9, 257; 84/601, 604, 609; 381/103, 104, 107, 109, 110, 56, 57, 61, 381/98
See application file for complete search history.

(56) References Cited

U.S. PATENT DOCUMENTS

| | | | |
|---|---|---|---|
| 7,769,183 B2 | 8/2010 | Bharitkar et al. | |
| 8,364,477 B2 * | 1/2013 | Song et al. | 704/226 |
| 8,640,021 B2 | 1/2014 | Perez et al. | |
| 8,854,447 B2 | 10/2014 | Conness et al. | |
| 9,047,054 B1 | 6/2015 | Goldstein et al. | |
| 9,099,972 B2 * | 8/2015 | Gao et al. | 381/107 |
| 9,264,834 B2 | 2/2016 | Soulodre | |
| 9,357,308 B2 | 5/2016 | Freeman | |
| 9,398,247 B2 * | 7/2016 | Tateishi | 725/10 |
| 9,398,392 B2 | 7/2016 | Ridihalgh et al. | |
| 2004/0013252 A1 * | 1/2004 | Craner | 379/142.01 |
| 2012/0123769 A1 * | 5/2012 | Urata | 704/225 |
| 2014/0280296 A1 | 9/2014 | Johnston et al. | |
| 2015/0010169 A1 | 1/2015 | Popova | |
| 2015/0078595 A1 | 3/2015 | Shintani et al. | |
| 2016/0227280 A1 | 8/2016 | Candelore | |
| 2016/0316059 A1 * | 10/2016 | Nuta et al. | 704/225 |

OTHER PUBLICATIONS

Labov, William, Sharon Ash, and Charles Boberg. "11: The Dialects of North American English." The Atlas of North American English: Phonetics, Phonology, and Sound Change: A Multimedia Reference Tool. Berlin: Mouton De Gruyter, 2006. 35 pages.

Wikipedia, "Auto-Tune," retrieved from http://en.wikipedia.org/wiki/auto-tune, on Mar. 16, 2017, 4 pages.

* cited by examiner

DYNAMICALLY ADJUST AUDIO ATTRIBUTES BASED ON INDIVIDUAL SPEAKING CHARACTERISTICS

TECHNICAL FIELD

The present disclosure relates generally to presenting content to a user, and more particularly, but not exclusively, to analyzing characteristics of the content and consuming user's environment to adjust one or more audio attributes of the content for presentation to the user via one or more audio devices.

BACKGROUND

Over the past few years, home-theater systems have greatly improved the presentation of content to users, such as in how users listen to and view content. This improvement has been aided by the number of content channels that are available to listen or watch at any given time, the quality of video and audio output devices, and the quality of the input signal carrying the content. However, when it comes to a user's individual listening or viewing characteristics or preferences, users are typically limited to manually adjusting the home-theater's audio or video settings. Such manual adjustments can be time consuming and distracting to the user, especially if the user is frequently changing channels or subsequently consuming different styles or types of content. It is with respect to these and other considerations that the embodiments herein have been made.

BRIEF SUMMARY

Briefly stated, embodiments are directed towards analyzing content to adjust at least one audio attribute of an audio component of the content to improve a user's audible perception of the content. In various embodiments, the content is analyzed to determine an accent of an individual speaking in the content, an ethnic origin of the individual, a gender of the individual, a genre of the content, or user preferences of the user ingesting the content, or some combination thereof. One or more of these determined characteristics is utilized to select and adjust at least one audio attribute of the audio component of the content. The audio component of the content is then output to at least one audio output device based on the at least one adjusted audio attribute. Adjustment of the audio attributes may include, for example, adjusting an overall volume of the audio component, adjusting a bass control of the audio component, or adjusting a treble control of the audio component. These audio attribute adjustments can improve a user's perception of the audio component, which can improve the user's understanding of the individual speaking in the content.

In some embodiments, the audio component of the content is separated into a plurality of audio channels to be output to a plurality of audio output devices. In at least one such embodiment, at least one audio attribute of at least one audio channel is adjusted based on the determined characteristic from the analysis of the content. In various embodiments, a location of the user relative to the plurality of audio devices may also be utilized to adjust at least one audio attribute of at least one audio channel provided to the audio devices.

The content receiver can receive additional manual audio attribute adjustments provided by the user. These manual adjustments are provided to a content-distribution server for determining at least one preferred audio attribute for a region in which the content receiver is located. In some embodiments, the content-distribution server determines a plurality of preferred audio attributes for a target region based on manual adjustments of audio attributes by a plurality of users in the target region. Those preferred audio attributes are provided to the content receiver as default audio attributes for the content receiver.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, the drawings include.

DETAILED DESCRIPTION

Figure 1:
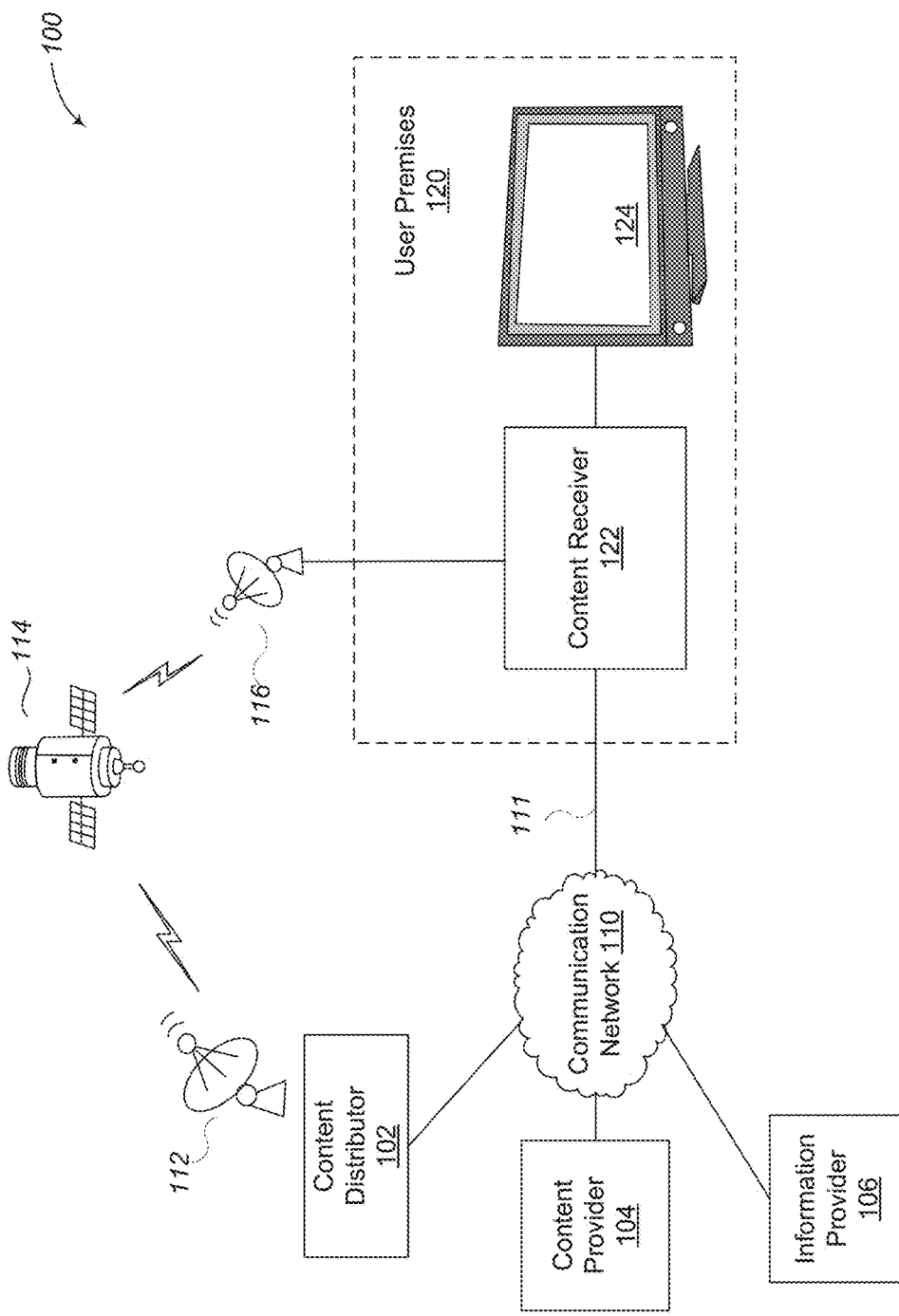
FIG. 1 illustrates a context diagram for providing content to a user in accordance with embodiments described herein.

FIG. 1 shows a context diagram of one embodiment for providing content to a user in accordance with embodiments described herein. Example 100 includes content provider 104, information provider 106, content distributor 102, communication networks 110, and user premises 120.

Typically, content providers 104 generate, aggregate, and/or otherwise provide content that is provided to one or more users. Sometimes, content providers are referred to as "channels" or "stations." Examples, of content providers 104 may include, but are not limited to, film studios; television studios; network broadcasting companies; independent content producers, such as AMC, HBO, Showtime, or the like; radio stations; or other entities that provide content for user consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes audio content or audiovisual content that includes a video component and an audio component.

Information provider 106 may create and distribute data or other information that describes or supports content. Generally, this data is related to the program content provided by content provider 104. For example, this data may include, for example, metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

Content distributor 102 may provide the content, whether obtained from content provider 104 and/or the data from information provider 106, to a user through a variety of different distribution mechanisms. For example, in some embodiments, content distributor 102 may provide the content and data to a user's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a user/customer at user premises 120.

Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Content receiver 122 is a device that receives the content from content distributor 102. Examples of content receiver 122 may include, but are not limited to, a set-top box, a cable connection box, a computer, television receiver, radio receiver, or other content receivers. Content receiver 122 may be configured to demultiplex the content and provide a visual component of the program content or other information to a user's display device 124, such as a television, monitor, or other display device and an audio component of the program content to the television or other audio output devices.

Content receiver 122 analyzes the content, such as the metadata or the video or audio components, to determine an accents of the individual speaking in the content, an ethnic origin of the individual speaking, a genre of the content, and one or more other acoustical properties of the content. The content receiver 122 automatically adjusts one or more audio attributes for one or more audio output devices based on the analysis of the content, which is discussed in more detail below.

Figure 2:
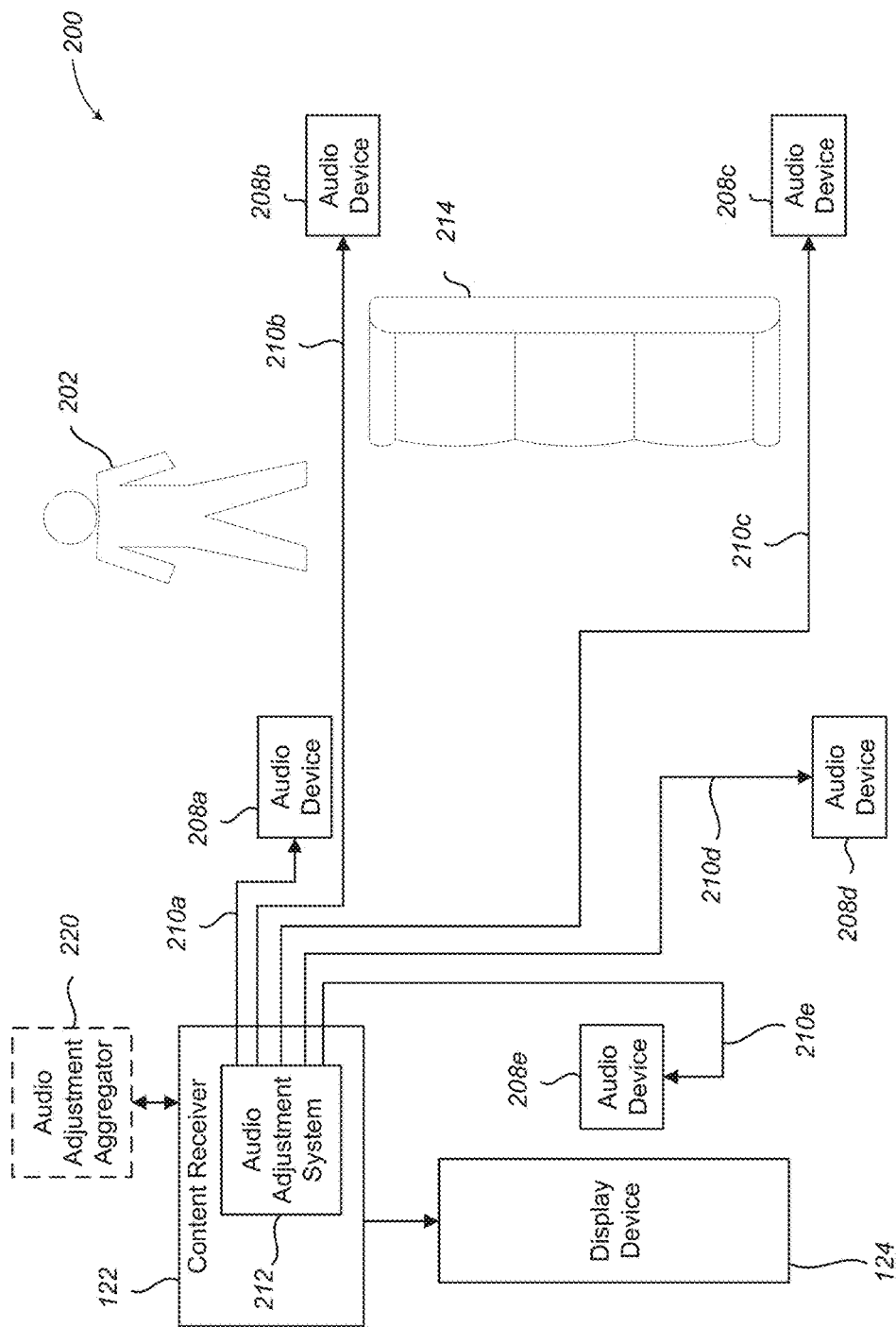
FIG. 2 is a context diagram of one non-limiting embodiment of a user's premises for presenting content to the user in accordance with embodiments described herein.

FIG. 2 is a context diagram of one non-limiting embodiment of a user's premises for presenting content to the user in accordance with embodiments described herein. The user's premises, or environment 200, includes content receiver 122, display device 124, and audio devices 208a-208e (collectively 208).

The content receiver 122 receives content from a content distributor, such as content distributor 102 described above. The content receiver 122 provides a video component of the received content to the display device 124 for rendering to a user 202. The content receiver 122 also includes an audio adjustment system 212 that manages an audio component of the received content for output to the audio devices 208a-208e.

In various embodiments, the audio adjustment system 212 separates the audio component of the content into multiple separate audio channels, where each separate audio channel is provided to a separate audio device 208a-208e via communication links 210a-210e, respectively. In some situations there may be more or less audio channels than the number of audio devices 208. If there are too many audio channels, then some audio channels may be ignored or some audio channels may be overlaid on each other or otherwise combined so that all audio associated with the received content is output via the one or more audio devices 208. If there are too few audio channels, one or more audio channels may be duplicated and provided to multiple audio devices 208 so that each audio device 208 is outputting some part of the audio component, or one or more of the audio devices 208 may not receive an audio channel.

In addition to separating the audio component into separate audio channels, the audio adjustment system 212 is configured to adjust at least one audio attribute of each separate audio channel. Accordingly, one or more audio attributes of each separate audio channel can be adjusted independent of one another or relative to one another. The types of audio attributes that can be adjusted may include, but are not limited to, overall volume, bass control, treble control, phase or delay adjustments, tone or frequency adjustments, or other types of equalizer adjustments that change the sound produced by an audio device or the sound perceived by a user.

The audio adjustment system 212 analyzes many different factors in determining what audio channels to adjust, what audio attribute(s) to adjust, and how to adjust those audio attribute(s). For example, in some embodiments, a user profile may be utilized to determine one or more adjustments to the audio attributes. In one non-limiting example, the user 202 can setup a user profile that indicates they are a little hard of hearing and need a higher overall volume. If the user 202 is detected as being in the environment 200, then a volume adjustment amount or level is obtained from the user's profile. In at least some embodiments, the user 202 can be detected as being in the environment 200 by various techniques, including, but not limited to, image recognition, receipt of an identifier from a mobile device (not illustrated) of the user, or the user inputting a code or otherwise notifying the audio adjustment system 212 that user 202 is in the environment 200 or watching the display device 124. The amount to increase the volume can be determined based on a volume level stored in the user profile or on a previous volume level that the user 202 manually adjusted.

In other embodiments, the location of the user 202 in the environment 200 can be used to adjust the audio attributes of the various audio channels. For example, the audio adjustment system 212 may have default audio attributes that assume the user is sitting on a couch 214. Accordingly, the volume of the audio device 208e may be higher than the audio devices 208b and 208c because audio device 208e is further from the couch 214 than audio devices 208b and 208c. Similarly, the audio signal provided to the various speakers can be time delayed to account for the time it takes the signal to reach the corresponding audio device 208 from the content receiver 122 and the time it takes sound to travel from the audio devices 208 to the user sitting on the couch. If the user 202 moves away from this seated position, such as standing closer to the audio devices 208a and 208b than the audio devices 208d and 208c, as illustrated, then the audio adjustment system 212 can adjust the volume and timing for the various audio channels for the audio devices 208a-208e such that the sound perceived by the user 202 sounds the same, or very close to the same, as the sound the user perceives while sitting on the couch 214. Movement of the user 202 throughout the environment 200 may be tracked via one or more motion sensors, image recognition, heat sensors, or other types of human or movement detection systems, and the audio adjustment system 212 can dynamically change the audio attributes as the user moves around the environment 200.

In yet other embodiments, various different acoustical properties of the environment 200 can be determined and used to adjust one or more audio attributes. For example, in some embodiment, one or more microphones (not illustrated) may be used to capture sound from the environment 200. This captured sound can be used to determine an amount of echo or reverberation of the sound produced by the audio devices 208 throughout the environment 200. Accordingly, the audio adjustment system 212 can adjust one or more audio attributes in an attempt to reduce the amount of reverb in the environment 200.

Some embodiments may utilize a plurality of different characteristics of the environment 200 and the user 202 to determine which audio attributes of which audio channels to adjust and how to adjust them. For example, if there are two people in the environment and one is hard of hearing, as discussed above, and that user is closer to audio device 208a, then only the volume of the audio channel for audio device 208a is increased so that other users in the environment 200 do not have to endure the higher volume.

Audio attributes can be adjusted throughout the presentation of content to the user 202. Such adjustments may be at periodic time intervals, randomly, when a change in the environment 200 is determined, or at other times. For example, as discussed in more detail below, audio attributes are also adjusted based on the content itself, or a combination of the content and the user 202. Briefly, such adjustment are based on an accent of an individual speaking in the content, an ethnic origin of the individual speaking, a gender of the individual speaking, a genre of the content, or other aspects of the content, or some combination thereof. Accordingly, adjustments to the audio attributes can be determined in response to changes associated with the received content.

In various embodiments, content receiver 122 communicates with audio adjustment aggregator 220 to receive one or more preferred or default audio attribute adjustments for use by the audio adjustment system 212. In other embodiments, the content receiver 122 provides audio attribute adjustments made by users 202 to the audio adjustment aggregator 220. In this way, audio attribute adjustments made by multiple users can be aggregated and shared with other users as a type of learning or feedback as to the best or most popular audio attribute adjustments. The audio adjustment aggregator 220 may be remote to environment 200, as indicated by the dashed lines in this figure. In at least one embodiment, the audio adjustment aggregator is integrated into or part of the content distributor 102.

The operation of certain aspects will now be described with respect to FIGS. 3-6. In at least one of various embodiments, processes 300, 400 and 500 described in conjunction with FIGS. 3-5, respectively, may be implemented by or executed on one or more computing devices, such as content receiver 122, and in some embodiments, audio adjustment system 212 executing on content receiver 122. In at least some embodiments, processes 600 described in conjunction with FIG. 6 may be implemented by or executed on one or more computing devices, such as audio adjustment aggregator 220.

Figure 3:
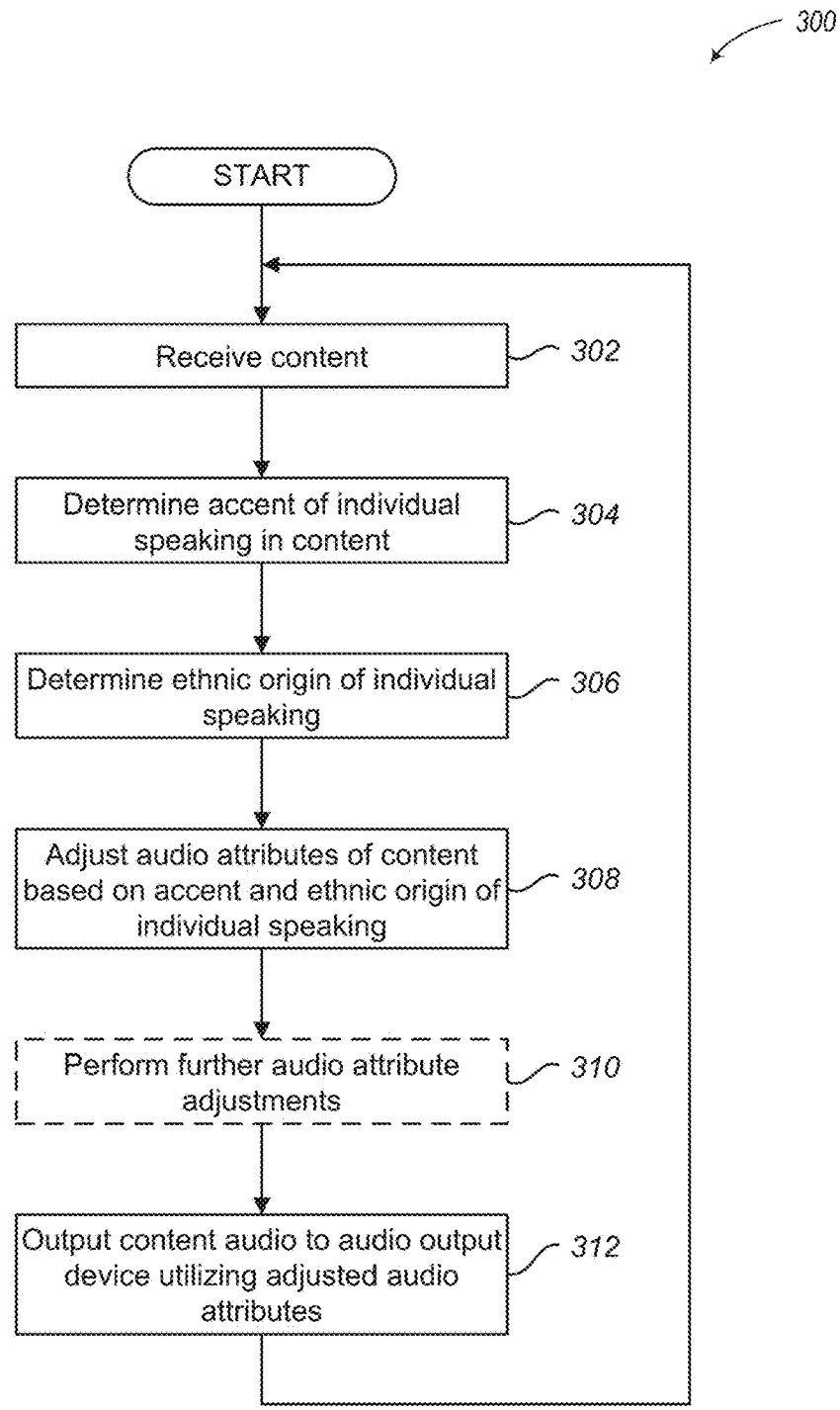
FIG. 3 illustrates a logical flow diagram generally showing one embodiment of an overview process for adjusting audio attributes of content in accordance with embodiments described herein.

FIG. 3 illustrates a logical flow diagram generally showing one embodiment of an overview process for adjusting audio attributes of content in accordance with embodiments described herein. Process 300 begins, after a start block, at block 302, where content is received. As discussed above, the content may be received from a content distributor or other content provider via a wired connection over a communication network or via a satellite link or other wireless connection. The content includes an audio component and a video component. As mentioned above, the audio component may include multiple audio channels for output to a plurality of audio devices.

Process 300 proceeds to block 304, where an accent of an individual speaking in the content is determined. Accent used herein refers to both accent and dialect and may include a single language or may include multiple languages. The individual that is speaking may be a single person speaking in the content, or it may include a plurality of people speaking. In situations where there are multiple people speaking, the audio component may be filtered to separate each individual speaker. In some embodiments, the individual speaking may include any situation where a voice is presenting words, such as a person talking, a person singing (e.g., background music), a character that is speaking (e.g., in animated content), etc.

The accent may be determined based on one or a combination of a plurality of different speech characteristics associated with the way the individual is speaking. Briefly, those speech characteristics may include, but are not limited to, pronunciation, grammar, word choice, slurring of words, use of made-up words, phonemes, and other speaking differences.

In some embodiments, the accent may be determined based on word selection by the individual, such as by using slang words that are specific to a geographical area. For example, use of the word "y'all" may indicate a southern United States accent, whereas use of the word "wicked" may indicate a New England accent.

In other embodiments, the accent may be determined based on the annunciation of specific words. For example, pronunciation of Oregon as "awr-i-guh n" may indicate a Northwestern accent, whereas a pronunciation of "awr-i-gon" may indicate a Midwest accent. As another example, pronunciation of wash as "warsh" may indicate a Midwest or East Coast accent.

In yet other embodiments, the accent may be determined based on the other grammatical differences, such as the order of words or the tense of verbs used. For example, the statement "Jenny feels ill. She ate too much," may indicate an American English accent, whereas the statement "Jenny feels ill. She's eaten too much," may indicate a British English accent.

In various embodiments, a table of a plurality of different accents and their associated speech characteristics is maintained by the system. In this way, the determined accent is the accent associated with the speech characteristics detected in the speech of the individual speaking. In some embodiments, the accent is determined when a threshold number of speech characteristics is detected for a particular accent. In other embodiments, the accent is determined based on a combination of detected speech characteristics. For example, since many different accents have similar speech characteristics, determining the appropriate accent may be based on a score assigned to multiple different accents. The score of each particular accent may be based on, such as the sum of, the total number of speech characteristics detected for that particular accent. In other embodiments, each speech characteristic may be weighted for each separate accent. The score for each particular accent is based on a combination, such as the sum, of the weights of the speech characteristics detected in for that particular accent. In at least one embodiment, the accent with the highest score is selected as the determined accent. In other embodiments, the determined accent is assigned a rating, grade, or weight indicating the accuracy of the determination, such as based on the score of the accent.

In some embodiments, the table of accents may be generated based on an analysis of speech patterns of people in different geographical regions. For example, the speech of a first group of people from a first region can be sampled and compared to speech of a different second group of people from a different second region to identify differences between the words utilized, pronunciation, choice of tense, pitch, and other grammar usages used by the different groups of people. In other embodiments, various analytic studies, such as Bayesian statistics and algorithms, may be used to group the speech of sampled people into different accents, independent of geographical region. Differences between these different accent grouping can be identified and utilized in the table of accents. One example writing that can be utilized to classify at least some accents is discussed on a webpage by Rick Aschmann, "North American English Dialects, Based on Pronunciation Patterns" (e.g., www.aschmann.net/AmEng/#SmallMapCanada).

Process 300 continues at block 306, where an ethnic origin of the individual speaking is determined. The ethnic origin may be determined based on a single visual or audible characteristic of the individual speaking, or it may be based on a combination of multiple different visual or audible characteristics of the individual. These visual or audible characteristics may be based on visual facial features of the individual, the accent of the individual, or other visual characteristics identifiable in the content.

For example, in some embodiments, visual facial features of the individual speaking may indicate the ethnic origin of the individual. Examples of such visual facial features includes, but is not limited to skin color, hair color, hair style, eye color, chin type, shape of the face or head, cheekbone pronunciation, or other facial features. The combination of these facial features may indicate a person as white, Asian, African, Middle-eastern, or some other ethic origin.

In other embodiments, the ethnic origin may be determined based on the accent of the individual. For example, an American English accent may indicate an ethnic origin of the United States, whereas a British English accent may indicate an ethnic origin of the United Kingdom. Accordingly, pronunciation, grammar, and word choice may be utilized to determine ethnic origin of the individual.

In some other embodiments, the ethnic origin may be determined based on visual characteristics of the environment surrounding the individual speaking. In at least one embodiment, image recognition techniques may be performed on the video component of the content to identify such visual characteristics. For example, the ethnic origin may be determined to be Asian if a pagoda is identified from an analysis of the video component. In contrast, the ethnic origin may be European if a medieval castle is identified in the content.

In various embodiments, the determination of the ethnic origin is a guess or estimate based on one or a combination of multiple different audio or visual features associated with individual speaking in the content. Accordingly, the determined ethnic origin may include a rating, grade, or weight indicating the accuracy of the determination.

Process 300 proceeds next to block 308, where one or more audio attributes of the content are adjusted based on the accent and the ethnic origin of the individual speaking. The audio attributes that may be adjusted may include one or more of the overall volume, bass control or amplitude, treble control or amplitude, phase or delay adjustments, pitch or frequency adjustments, or other types of equalizer adjustments that change the sound produced by an audio device or the sound perceived by a user.

For example, if the accent of the individual speaking is a Southern accent, then the audio may have a higher pitch resulting from the individual speaking with a "country twang." Accordingly, the treble audio attribute may be reduced or filtered to remove at least some of the "twang" from the audio, which may be more appealing to the user listening. In another example, the overall volume may be reduced if accent of the individual speaking is British English. These examples are merely for illustration purposes and other audio attribute adjustments can be made.

In various embodiments, the system maintains a database of audio attribute adjustments for different combinations of accent and ethnic origin. In this way, a table or other data structure can be used to select the audio attributes to adjust and how much to adjust them based on the accent and ethnic origin determined in blocks 304 and 306. In some embodiments, only the accent and not the ethnic origin may be used to determine the audio attribute adjustments.

In some embodiments, this database of accent and ethnic origin to audio attribute adjustments may be compiled based on adjustments the user or listener makes for the various different accents and ethnic origins. For example, the user may be presented with a setup mode that outputs various different accents of people of different ethnic origins. The user can then manually adjust the audio attributes until the sound is most clear to that user. In some embodiments, the system may systematically transition between different combinations of audio attribute adjustments from which the user can select the best sounding combination.

In yet other embodiments, the audio adjustments may be predetermined based on feedback or manual adjustments made by other people that are similar to the user. For example, the user can provide their ethnic origin, accent, geographical location, age, gender, etc., and the system selects audio attribute adjustments that are the same or similar to audio attributes adjustments made by other users having similar characteristics. One embodiment of setting default audio attributes based on other users is described in more detail below in conjunction with FIG. 6.

It should be recognized that voice adjustment devices and programs have been available for many years. For example, a product called Auto-Tune is an audio processor that measures and alters the pitch of vocal and instrumental music recordings and performances. This product slightly shifts the pitch to the nearest true semitone in an attempt to produce in-tune vocals even if the singer is singing off key.

A user can set Auto-Tune to various different levels of aggressiveness, from slight to very aggressive—the more aggressive the setting, the greater the adjustment. As a result, aggressive settings can be used to distort the human voice to sound robotic and even change notes. However, these types of audio processing products merely shift the pitch of the singer or instrument based on whether it is out of tune or not. They do not account for the type of accent of the individual speaking, the gender of the individual speaking, the ethnic origin individual speaking, or other characteristics, as described herein.

Accordingly, if a person is talking with a very heavy accent through Auto-Tune, they will be perfectly in tune, but may still be difficult to understand. In contrast, embodiments described herein utilize various characteristics of the user to modify audio attributes to improve a listener's perception and understanding of the individual speaking. As mentioned above, since people perceive accents from different people in different ways, it may be more difficult for one listener to understand one type of accent than for another listener, regardless of whether they are perfectly in tune or not. However, adjusting at least one audio attribute for the specific accent and ethnic origin of the individual speaking in the content can improve a listener's perception and understanding of the individual speaking.

Process 300 continues next at block 310, where additional audio attribute adjustments are performed, which is discussed in more detail below in conjunction with FIGS. 4 and 5. In various embodiments, block 310 may be optional and may not be performed.

Process 300 proceeds to block 312, where the audio component of the content is output to one or more audio output devices utilizing the adjusted audio attribute(s). As indicated above, the audio component may be separated into a plurality of audio channels, and one or more audio attributes may be adjusted for one or more of those audio channels. Accordingly, each audio channel is provided to a corresponding audio device 208, such as a speaker.

After block 312, process 300 loops to block 302 to continue to receive additional content. Since the individuals in the content who are speaking can change over time as the content is received, process 300 can continually execute and dynamically adjust the audio attributes based on the current individual that is speaking in the content throughout the entire presentation of the content.

Figure 4:
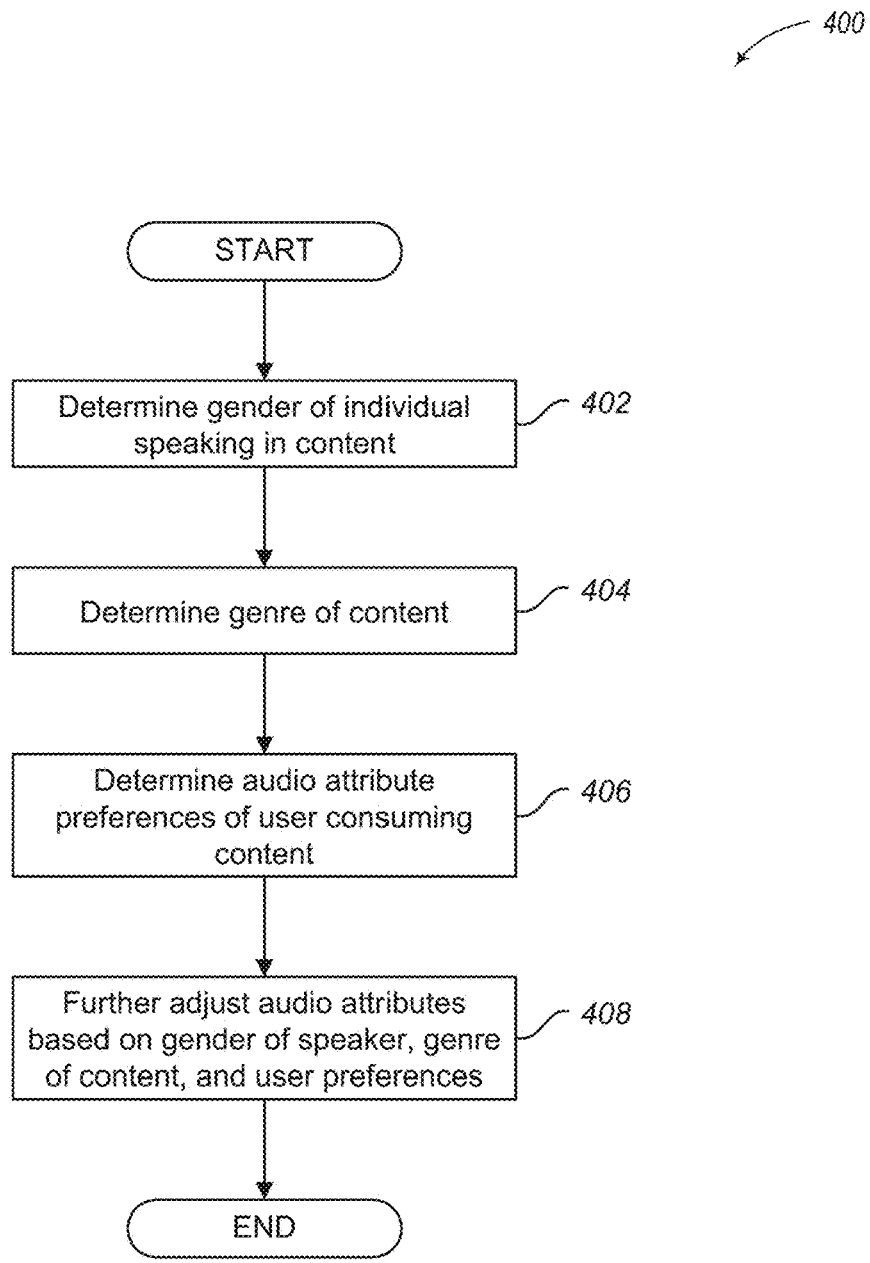
FIG. 4 illustrates a logical flow diagram generally showing one embodiment of a process for analyzing content and user preferences to further adjust audio attributes of the content in accordance with embodiments described herein.

FIG. 4 illustrates a logical flow diagram generally showing one embodiment of a process for analyzing content and user preferences to further adjust audio attributes of the content in accordance with embodiments described herein. In various embodiments, process 400 may be utilized in conjunction with process 300 in FIG. 3 to further adjust the audio attributes of the content provided to a user.

Process 400 begins, after a start block, at block 402, where a gender of the individual speaking in the content is determined. In various embodiments, image processing techniques may be utilized to determine the gender of the individual speaking. The gender may be determined based on hair length or style, body size or shape, or various facial features. In other embodiments, the accent or the tone of the individual speaking may also be used to determine the gender of the individual.

Process 400 proceeds to block 404, where a genre of the content is determined. In various embodiments, the content has corresponding metadata that includes a plurality of different information about the content. For example, the metadata may include a title of the content, a length of the content, a genre of the content, a list of actors or actresses, or other information. In at least one embodiment, the genre is identified from the metadata associated with the content. In other embodiments, visual aspects of the content may be utilized to determine the genre. For example, if, but using various image recognition techniques, a plurality of cowboy hats and horses are identified, then the genre may be identified as being a Western. In yet other embodiments, the user may select or otherwise specify the genre of the content.

Process 400 continues at block 406, where one or more audio preferences of the user that is consuming the content are determined. As indicated above, the content receiver may store one or more user profiles for each user of the content receiver. The user profile includes one or more audio preferences for each user. These preferences may include a preferred volume level; a preferred bass, treble, or other equalizer ratio; or other preferences for one or more audio attributes. In some embodiments, the preferences may also include a preferred sitting location within the user's premises. This sitting preference can be used to automatically adjust the audio preferences to each of a plurality of audio devices to provide the most dynamic sound (i.e., the sound from each audio device reaches the user at the same time with a relative volume as if the user was sitting equidistant from each audio device) at the preferred sitting location.

Process 400 proceeds next to block 408, where one or more of the audio attributes of the content are further adjusted based on the gender of the speaker, the genre of the content, or the user preferences, or a combination thereof. In various embodiments, block 408 performs embodiments similar to block 308 in FIG. 3. For example, the database described in block 308 may also include additional entries for combinations of gender, genre, or other user preferences along with the accent and ethnic origin of the individual speaking in the content and their corresponding audio attribute adjustments. Similarly, the audio attribute adjustments may be selected from previous manual adjustments by the user or by other users.

Various embodiments can utilize one or a combination of a plurality of the accent of the individual speaking, ethnic origin of the individual, gender of the individual, genre of the content, and user preferences to select and adjust one or more audio attributes.

After block 408, process 400 terminates or returns to a calling process to perform other actions.

Figure 5:
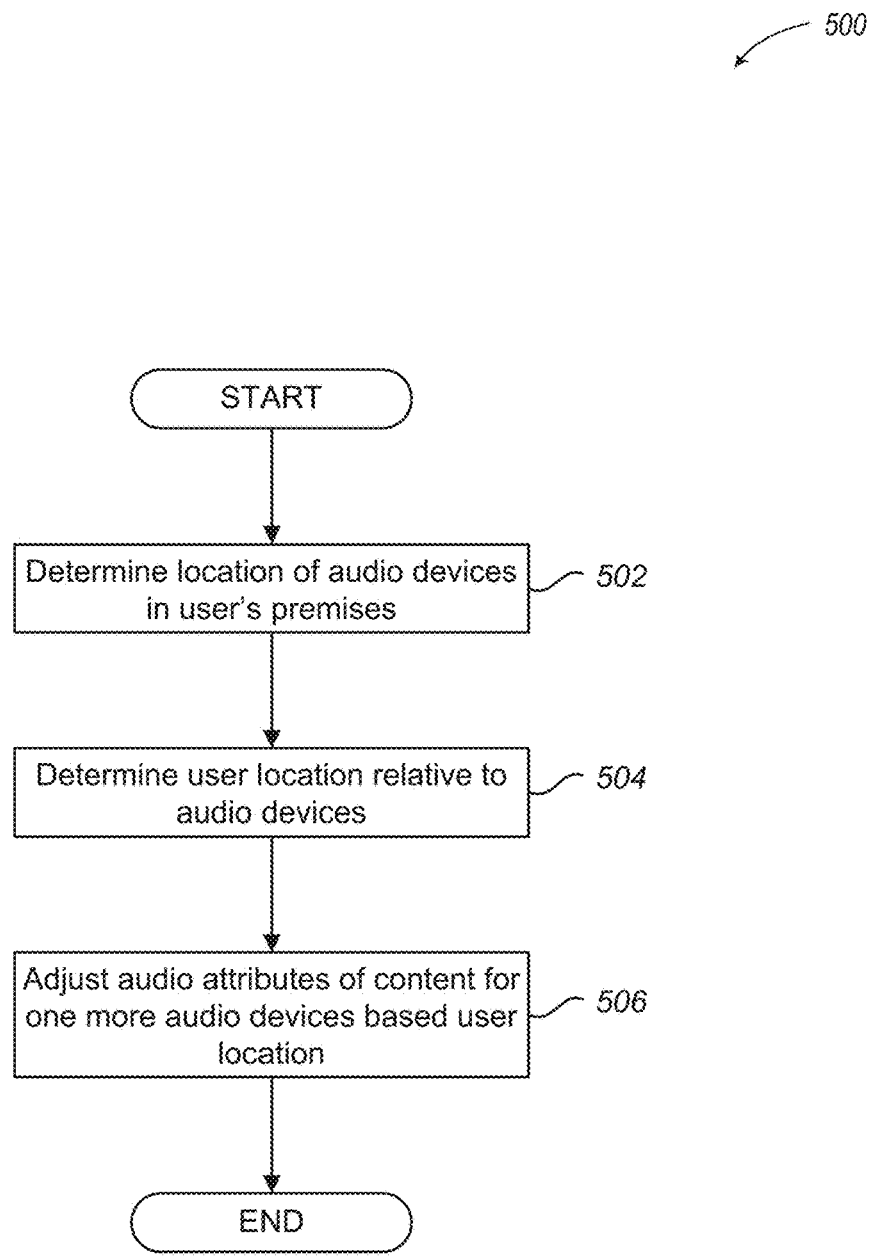
FIG. 5 illustrates a logical flow diagram generally showing one embodiment of another process for further adjusting audio attributes of the content in accordance with embodiments described herein.

FIG. 5 illustrates a logical flow diagram generally showing one embodiment of another process for further adjusting audio attributes of the content in accordance with embodiments described herein. In various embodiments, process 500 may be utilized in conjunction with process 300 in FIG. 3 to further adjust the audio attributes of the content provided to a user.

Process 500 begins, after a start block, at block 502, where a location of one or more audio devices within a user's premises is determined. In some embodiments, the location of the audio devices may be manually input by the user using a graphical user interface (GUI). The GUI may display a room that approximates the user's premises. The user can then adjust the shape of the displayed room and the location of the audio devices in the room. The user can also input the location of the content receiver, the display device, and any couches or chairs in the user's premises.

In other embodiments, the content receiver can determine the location of the audio devices based on a ping and response method. In this way, the content receiver includes a microphone that captures the output from the audio devices. The content receiver sends an audio signal to each audio device individually and then captures the sounds produced by the audio device at the microphone. Based on the time it took the sound to come back to the microphone from the time the initial audio signal is sent can be used to approximate the distance the audio device is from the content receiver. In some embodiments, multiple microphones can be used to triangulate the location of the audio devices based on differences in time between the sound captured by the microphones.

In yet other embodiments, cameras may be utilized along with image recognition techniques to identify audio devices and their location in the user's premises.

Process 500 proceeds to block 504, where a location of the user is determined relative to the location of the audio devices. In various embodiments, cameras may be utilized along with image recognition techniques to identify where in the user's premises is the user located. This location along with the location of the audio devices can be used to determine the geospatial relationship between the user and the various audio devices.

Process 500 continues at block 506, where one or more of the audio attributes for one or more specific audio devices are further adjusted based on the user's location. In various embodiments, the audio attributes of one or more individual channels is adjusted based on the location of the user relative to the audio devices. For example, in some embodiments, the volume output by a first audio device may be increased and the volume output by a second audio device may be decreased because the user is located closer to the second audio device than the first audio device.

After block 506, process 500 terminates or returns to a calling process to perform other actions. In various embodiments, process 500 or a portion thereof may be continually performed as the content is received, performed at periodic intervals throughout the receipt of the content, performed randomly, or performed when user movement is detected, which can provide for dynamic adjustments of audio attributes as the user moves throughout the user's premises.

Figure 6:
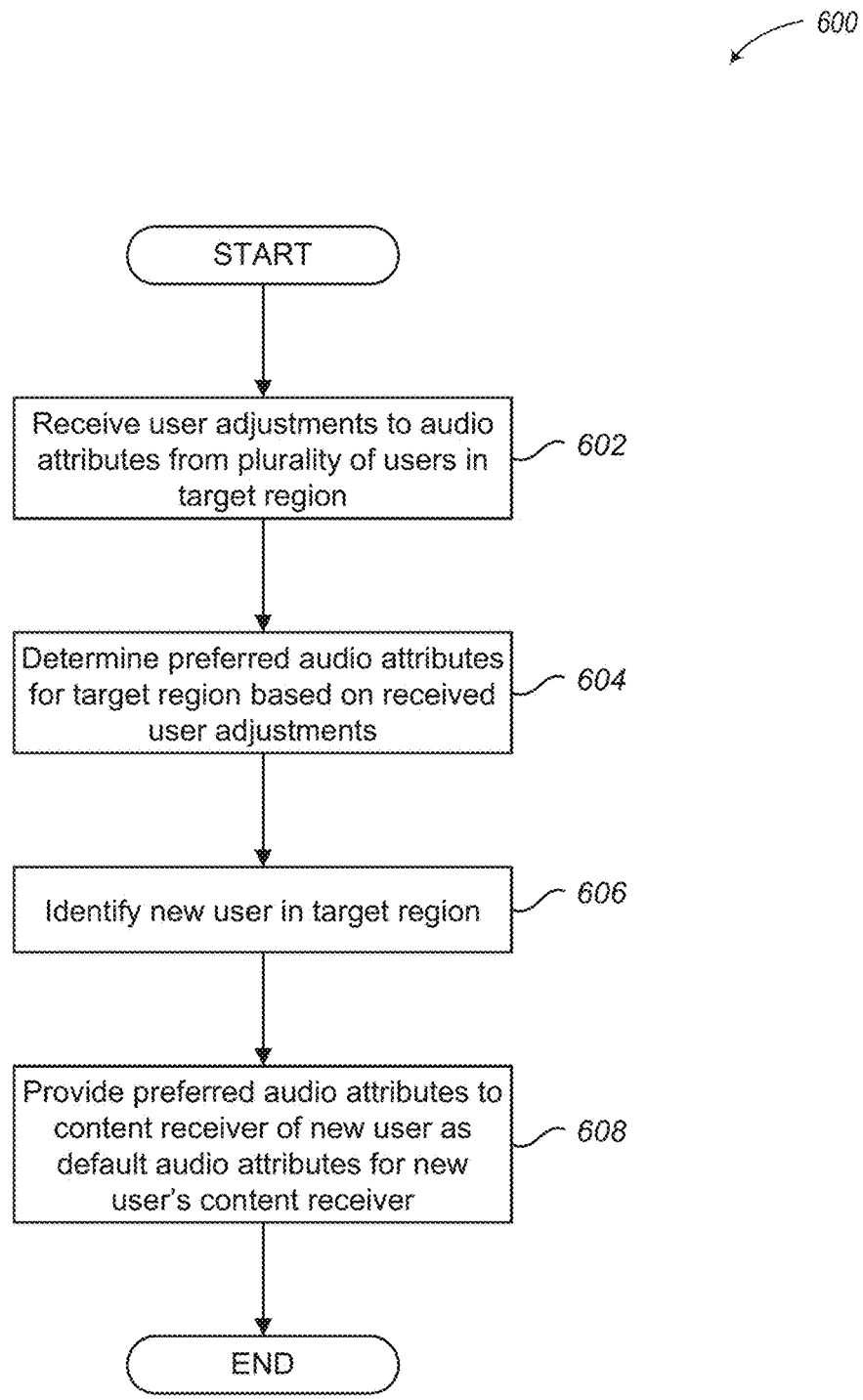
FIG. 6 illustrates a logical flow diagram generally showing an embodiment of a process for providing default audio attributes to a user in a target region in accordance with embodiments described herein.

FIG. 6 illustrates a logical flow diagram generally showing an embodiment of a process for providing default audio attributes to a user in a target region in accordance with embodiments described herein.

Process 600 begins, after a start block, at block 602, where user adjustments to one or more audio attributes are received from a plurality of users in a target region. In various embodiment, the audio attribute adjustments may include information regarding which audio attributes were adjusted and by how much. The information may also include other information about the content itself along with the corresponding audio attribute adjustment. This other information may include, but is not limited to, the accent or ethnic origin of an individual speaking in the content at the time the audio attribute adjustment is made, a genre of the content, user preferences, or other characteristics of the user or the content.

In response to a user making manual audio attribute adjustments via a content receiver, the content receiver sends the audio attribute adjustments to a centralized database, such as via an Internet connection. This centralized database aggregates audio attribute adjustments for multiple users in a target region.

In some embodiments, the target region is a known geographical region, such as Harney County, Oreg. Accordingly, audio attribute adjustments from users in Harney County are collected and aggregated. In other embodiments, the target region may be for users in Oregon with a particular accent. Accordingly, audio attribute adjustments are received from only those users with that particular accent. Although this example utilizes accent, other characteristics may also be utilized, such as ethnic origin, age, gender, or other demographic identifier.

Process 600 proceeds to block 604, where one or more preferred audio attributes are determined for the target region based on the received user adjustments. In various embodiments, the preferred audio attributes are generic or default audio attributes independent of content, such as a default volume level, bass and treble control level, etc. In other embodiments, the preferred audio attributes are default audio attributes for specific characteristics of the content, such as accents, ethnic origin, genre, etc.

The preferred audio attributes may be selected based on the number or percentage of users that make the same or similar adjustments to one or more audio attributes. In some embodiments, the preferred audio attribute for a particular audio attribute may be the mean, median, or mode value for that particular audio attribute. For example, if 90 out of 100 users in the target region turn up the bass attribute to level X while watching a western action movie, then the preferred audio attribute for the bass attribute for western action movies for the target region is set to level X.

Process 600 continues at block 606, where a new user in the target region is identified. In some embodiments, this new user may be identified as a new user that registers with the database, purchases a subscription to receive content, etc. In at least one embodiment, a content receiver of the new user communicates or registers with the database.

Process 600 proceeds next to block 608, where the preferred audio attributes are provided to the content receiver of the new user as default audio attributes for the new user's content receiver. In various embodiments, only the default preferred attributes independent of the content are provided to the content receiver. In other embodiments, a plurality of different preferred audio attributes or a plurality of sets of preferred audio attributes are provided to the new user's content receiver, where each set of preferred audio attributes corresponds to different combinations of content and user characteristics, such as accent, ethnic origin, genre, gender, etc. These preferred audio attributes can then be utilized by the new user's content receiver to automatically adjust the audio attributes for the new user as described above in conjunction with FIGS. 3-5. The user can then make additional audio attribute adjustment as needed.

After block 608, process 600 terminates or otherwise returns to a calling process to perform other actions.

Figure 7:
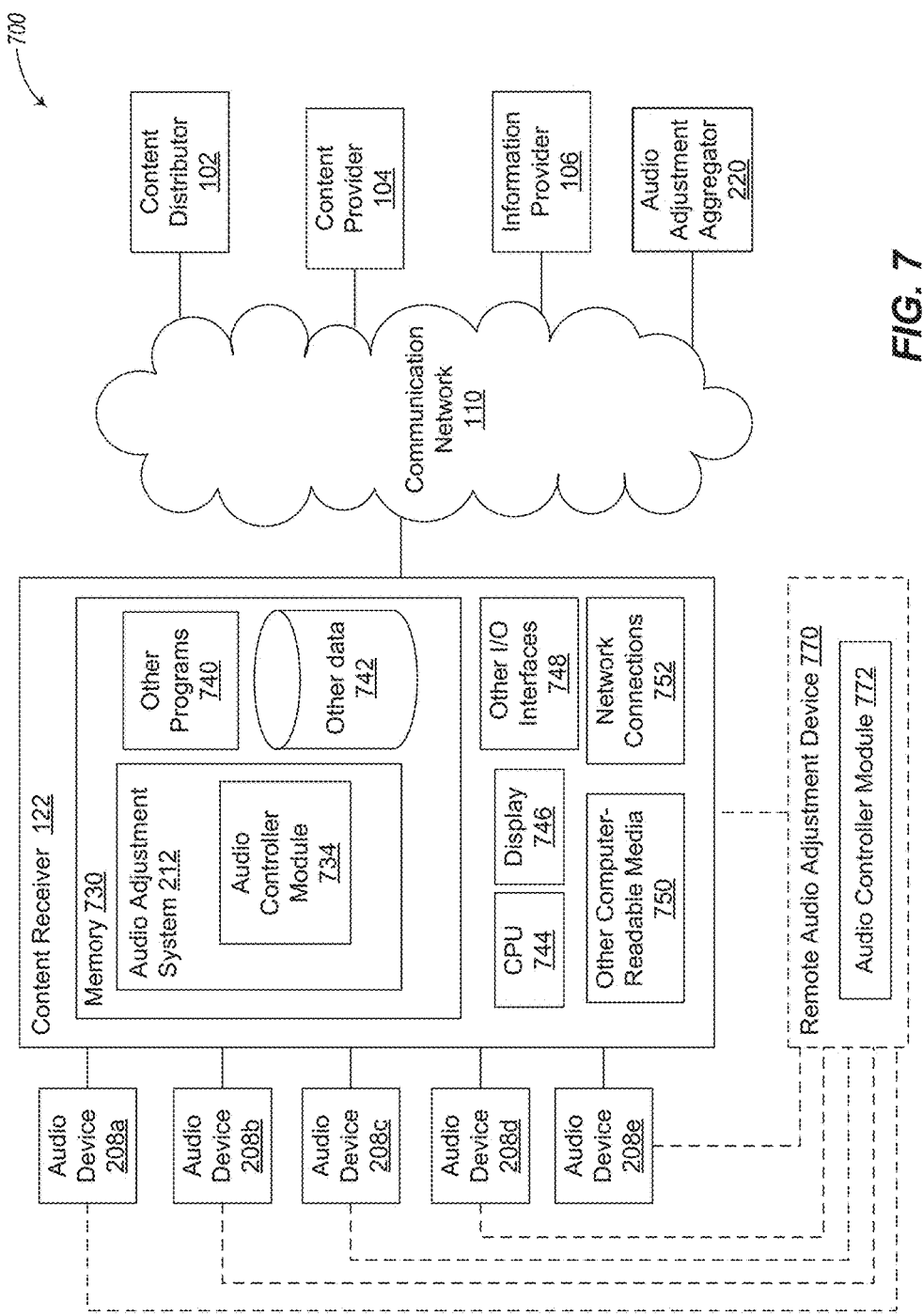
FIG. 7 shows a system diagram that describes one implementation of computing systems for implementing embodiments described herein.

FIG. 7 shows a system diagram that describes one implementation of computing systems for implementing embodiments described herein. System 700 includes content receiver 122, content distributor 102, content provider 104, and information provider 106.

Content receiver 122 receives content from content distributor 102 and analyzes the content to determine what audio attributes should be adjusted and how they should be adjusted based on various characteristics of the individual speaking in the content, characteristics of the content, and preferences of the user consuming the content, as described herein. One or more general-purpose or special-purpose computing systems may be used to implement content receiver 122. Accordingly, various embodiments described herein may be implemented in software, hardware, firmware, or in some combination thereof. Content receiver 122 may include memory 730, one or more central processing units (CPUs) 744, display interface 746, other I/O interfaces 748, other computer-readable media 750, and network connections 752.

Memory 730 may include one or more various types of non-volatile and/or volatile storage technologies. Examples of memory 730 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 730 may be utilized to store information, including computer-readable instructions that are utilized by CPU 744 to perform actions, including embodiments described herein.

Memory 730 may have stored thereon audio adjustment system 212, which includes audio controller module 734. The audio controller module 734 may employ embodiments described herein to analyze content to determine an accent of the individual speaking in the content, an ethnic origin of the individual, a gender of the individual, a genre of the content, or other characteristics of the content or the users ingesting the content. The audio controller module 734 utilizes the adjusted audio attributes to provide audio to the audio devices 208a-208e.

Memory 730 may also store other programs 740 and other data 742. For example, other data 742 may include one or more default audio attributes for the users, user preferences or profiles, or other data.

Display interface 746 is configured to provide content to a display device, such as display device 124 in FIG. 1. Network connections 752 are configured to communicate with other computing devices, such as content distributor 102, via communication network 110. Other I/O interfaces 748 may include a keyboard, audio interfaces, other video interfaces, or the like. Other computer-readable media 750 may include other types of stationary or removable computer-readable media, such as removable flash drives, external hard drives, or the like.

The content receiver 122 also communicates with the audio adjustment aggregator 220 via communication network 110 to provide audio attribute adjustments and receive preferred or default audio attribute adjustments, as described herein. The audio adjustment aggregator 220 includes computing components similar to content receiver 122 (e.g., a memory, processor, I/O interfaces, etc.), but are not illustrated here for convenience.

Content distributor 102, content provider 104, information provider 106, and content receiver 122 may communicate via communication network 110.

In some embodiments, content distributor 102 includes one or more server computer devices to detect future program and provide tags for the future programs to corresponding content receivers 122. These server computer devices include processors, memory, network connections, and other computing components that enable the server computer devices to perform actions as described herein.

In some embodiments, the system 700 optionally includes a remote audio adjustment device 770. The remote audio adjustment device 770 includes computing components similar to content receiver 122 (e.g., a memory, processor, I/O interfaces, etc.), but are not illustrated here for convenience.

The remote audio adjustment device 770 is a computing device that is separate from the content receiver 122 and includes an audio controller module 772 to receive at least the audio component of the content from the content receiver 122 and provide corresponding audio channels of the audio component to the audio devices 208a-208e. Examples of the remote audio adjustment device 770 include, but are not limited to, stereo receivers, home theater systems, or other audio management devices. In some embodiments, audio controller module 772 may perform embodiments of audio controller module 734. In this way the remote audio adjustment device 770 adjusts the audio attributes as described herein rather than the content receiver 122.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method that is executed on a content receiver, comprising:
    receiving content for presentation to a user, the content includes an audio component;
    analyzing the audio component of the content to determine a language accent of an individual speaking in the content;
    determining an ethnic origin of the individual speaking based on visual characteristics of the individual speaking;
    adjusting at least one audio attribute of the audio component of the content based on the language accent and the determined ethnic origin of the individual speaking in the content; and
    outputting the audio component of the content to at least one audio output device based on the at least one adjusted audio attribute.

2. The method of claim 1, wherein adjusting the at least one audio attribute includes at least one of:
    adjusting an overall volume of the audio component;
    adjusting a bass control of the audio component; and
    adjusting a treble control of the audio component.

3. The method of claim 1, wherein adjusting the at least one audio attribute includes:
    separating the audio component of the content into a plurality of audio channels to be output to a plurality of audio output devices; and
    performing at least one of:
        modifying a volume of a first audio channel of the plurality of audio channels;
        modifying a bass control of a second audio channel of the plurality of audio channels; and
        modifying a treble control of a third audio channel of the plurality of audio channels.

4. The method of claim 1, further comprising:
    determining a genre of the content based on metadata received with the content; and
    adjusting the at least one audio attribute based on the determined genre.

5. The method of claim 1, further comprising:
    determining at least one listening preference of the user; and
    performing further adjustments to the at least one audio attribute based on the at least one listening preference of the user.

6. The method of claim 1, further comprising:
    determining a location of each of the at least one audio output device;

determining a location of the user relative to the location of the at least one audio output device; and adjusting the at least one audio attribute for each of the at least one audio output device based on the user's determined location.

7. The method of claim 1, further comprising:
receiving at least one manual adjustment to the at least one audio attribute; and
providing the at least one manual adjustment to a content-distribution server for determining at least one preferred audio attribute for a region in which the content receiver is located.

8. The method of claim 1, further comprising:
determining a geographical region where the content receiver is located; and
receiving a plurality of default audio attributes for the content receiver based on a plurality of preferred audio attributes identified for the geographical region.

9. The method of claim 8, wherein the plurality of preferred audio attributes are identified for the geographical region based on manual adjustments of audio attributes by other users in the geographical region.

10. The method of claim 1, wherein analyzing the audio component of the content to determine the language accent of the individual speaking includes:
determining the language accent of the individual speaking based on a combination of a plurality of speech characteristics that includes at least one of pronunciation, grammar, word choice, slurring of words, use of made-up words, or phonemes.

11. A system, comprising:
a content receiver that includes a first memory for storing first instructions and a first processor that executes the first instructions to perform actions, the actions, including:
receiving content for presentation to a user, the content including an audio component;
analyzing the audio component of the content to determine a gender of an individual speaking in the content;
analyzing the audio component of the content to determine an accent of the individual speaking;
analyzing the audio component of the content to determine an ethnic origin of the individual speaking;
determining a location of the user relative to a location of each of a plurality of audio output devices;
adjusting at least one audio attribute of the audio component of the content based on the gender of the individual speaking in the content, the accent of the individual speaking in the content, the determined ethnic origin of the individual speaking in the content, and the user's location;
utilizing the at least one adjusted audio attribute to output the audio component of the content to the plurality of audio output devices;
receiving at least one manual adjustment to the at least one audio attribute; and
providing the at least one manual adjustment to a content-distribution server for determining at least one preferred audio attribute for a region in which the user is located; and
the content-distribution server includes a second memory for storing second instructions and a second processor that executes the second instructions to perform other actions, the other actions, including:
determining a geographical region where the content receiver is being utilized by the user;
receiving manual adjustments of audio attributes by other users in the geographical region;
identifying a plurality of preferred audio attributes for the geographical region based on the manual adjustments of audio attributes by the other users; and
providing, independent of the content, a plurality of default audio attributes for the content receiver based on a plurality of preferred audio attributes identified for the geographical region.

12. The system of claim 11, wherein adjusting the at least one audio attribute includes at least one of:
adjusting a volume of the audio component;
adjusting a bass control of the audio component; and
adjusting a treble control of the audio component.

13. The system of claim 11, wherein adjusting the at least one audio attribute includes:
separating the audio component of the content into a plurality of audio channels to be output to a plurality of audio output devices; and
performing at least one of:
modifying a volume of a first audio channel of the plurality of audio channels;
modifying a bass control of a second audio channel of the plurality of audio channels; and
modifying a treble control of a third audio channel of the plurality of audio channels.

14. The system of claim 11, further comprising:
determining a genre of the content based on metadata received with the content; and
adjusting the at least one audio attribute based on the determined genre.

15. A content receiver, comprising:
an input that receives program content;
a memory that stores at least instructions; and
a processor that executes the instructions to:
analyze an audio component of the program content to determine at least one speaking characteristic of an individual speaking in the content;
determine dialect of the individual speaking based on the at least one speaking characteristic;
determine at least one audio attribute of the audio component to adjust based on the dialect;
adjust the at least one audio attribute of the audio component based on the dialect of the individual speaking in the content; and
output the audio component of the content to at least one audio output device based on the at least one adjusted audio attribute.

16. The content receiver of claim 15, wherein the processor executes further instructions to adjust the at least one audio attribute by performing at least one of:
adjust a volume of the audio component;
adjust a bass control of the audio component; and
adjust a treble control of the audio component.

17. The content receiver of claim 15, wherein the processor executes further instructions to:
separate the audio component of the content into a plurality of audio channels to be output to a plurality of audio output devices; and
modify a bass control or a treble control of each separate audio channel of the plurality of audio channels.

18. The content receiver of claim 15, wherein the processor executes further instructions to:
determine a genre of the content based on metadata received with the content; and
adjust the at least one audio attribute based on the determined genre.

19. The method of claim 15, wherein the processor executes further instructions to:
- receive at least one manual adjustment to the at least one audio attribute; and
- provide the at least one manual adjustment to a content-distribution server for determining at least one preferred audio attribute for a region in which the content receiver is located.

20. The content receiver of claim 15, wherein the processor executes further instructions to:
- determine a geographical region where the content receiver is located; and
- receive a plurality of default audio attributes for the content receiver based on a plurality of preferred audio attributes identified for the geographical region.

21. The content receiver of claim 20, wherein the plurality of preferred audio attributes are identified for the geographical region based on manual adjustments of audio attributes by other users in the geographical region.

* * * * *